(12) United States Patent
Taguchi et al.

(10) Patent No.: US 8,805,057 B2
(45) Date of Patent: Aug. 12, 2014

(54) METHOD AND SYSTEM FOR GENERATING STRUCTURED LIGHT WITH SPATIO-TEMPORAL PATTERNS FOR 3D SCENE RECONSTRUCTION

(75) Inventors: Yuichi Taguchi, Arlington, MA (US); Amit Agrawal, Somerville, MA (US); Oncel Tuzel, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 64 days.

(21) Appl. No.: 13/562,406

(22) Filed: Jul. 31, 2012

(65) Prior Publication Data

US 2014/0037146 A1 Feb. 6, 2014

(51) Int. Cl.
*G06T 7/00* (2006.01)

(52) U.S. Cl.
USPC .............................. 382/154; 382/153; 901/47

(58) Field of Classification Search
CPC .................................................... G06T 7/0057
USPC .................. 382/154; 345/419–427
See application file for complete search history.

(56) References Cited

U.S. PATENT DOCUMENTS

2008/0205748 A1* 8/2008 Lee et al. ...................... 382/154
2012/0294510 A1* 11/2012 Zhang et al. .................. 382/154

OTHER PUBLICATIONS

Li Zhang; Curless, B.; Seitz, S.M., "Rapid shape acquisition using color structured light and multi-pass dynamic programming," 3D Data Processing Visualization and Transmission, 2002. Proceedings. First International Symposium on , vol., No., pp. 24,36, 2002.*
"hie' rarchically, adv.". OED Online. Dec. 2013. Oxford University Press. http://www.oed.com/view/Entry/86788?redirectedFrom=hierarchically (accessed Dec. 26, 2013).*
Quiroga JA, Crespo DD, Vargas J, Gomez-Pedrero JA; Adaptive spatiotemporal structured light method for fast three-dimensional measurement. Opt. Eng. 0001;45(10):107203-107203-8.*
Kang, Sing Bing, and Richard Szeliski. "Extracting view-dependent depth maps from a collection of images." International Journal of Computer Vision 58, No. 2 (2004): 139-163.*
Jianfeng Wang; Cha Zhang; Wenwu Zhu; Zhengyou Zhang; Zixiang Xiong; Chou, P.A., "3D scene reconstruction by multiple structured-light based commodity depth cameras," Acoustics, Speech and Signal Processing (ICASSP), 2012 IEEE International Conference on , vol., No., pp. 5429,5432, Mar. 25-30, 2012.*
Troccoli, A.; Sing Bing Kang; Seitz, S., "Multi-View Multi-Exposure Stereo," 3D Data Processing, Visualization, and Transmission, Third International Symposium on , vol., No., pp. 861,868, Jun. 14-16, 2006.*

(Continued)

*Primary Examiner* — Chan Park
*Assistant Examiner* — Geoffrey E Summers
(74) *Attorney, Agent, or Firm* — Dirk Brinkman; Gene Vinokur

(57) ABSTRACT

A structured light pattern including a set of patterns in a sequence is generated by initializing a base pattern. The base pattern includes a sequence of colored stripes such that each subsequence of the colored stripes is unique for a particular size of the subsequence. The base pattern is shifted hierarchically, spatially and temporally a predetermined number of times to generate the set of patterns, wherein each pattern is different spatially and temporally. A unique location of each pixel in a set of images acquired of a scene is determined, while projecting the set of patterns onto the scene, wherein there is one image for each pattern.

14 Claims, 8 Drawing Sheets

(56) References Cited

OTHER PUBLICATIONS

Collins, R.T., "A space-sweep approach to true multi-image matching," Computer Vision and Pattern Recognition, 1996. Proceedings CVPR '96, 1996 IEEE Computer Society Conference on, vol., No., pp. 358,363, Jun 18-20, 1996.*

Goesele, M.; Curless, B.; Seitz, S.M., "Multi-View Stereo Revisited," Computer Vision and Pattern Recognition, 2006 IEEE Computer Society Conference on, vol. 2, No., pp. 2402,2409, 2006.*

Pagès, Jordi, Joaquim Salvi, Christophe Collewet, and Josep Forest. "Optimised De Bruijn patterns for one-shot shape acquisition." Image and Vision Computing 23, No. 8 (2005): 707-720.*

Li Zhang et al. "Rapid shape acquisition using color structured light and multi-pass dynamic programming," 3D Data Processing Visualization and Transmission, 2002. Proceedings. First International Symposium on Jun. 19-21, 2002. Piscataway, NJ, USA. IEEE. ISBN: 978-0-7695-1521-2.

J.A. Quiroga et al. "Adaptive spatiotemporal structured light method for fast three-dimensional measurement." SPIE, PO Box 10 Bellingham WA, 98227-0010, USA. vol. 45, No. 10. 107203. Oct. 26, 2006. XP040214666.

* cited by examiner

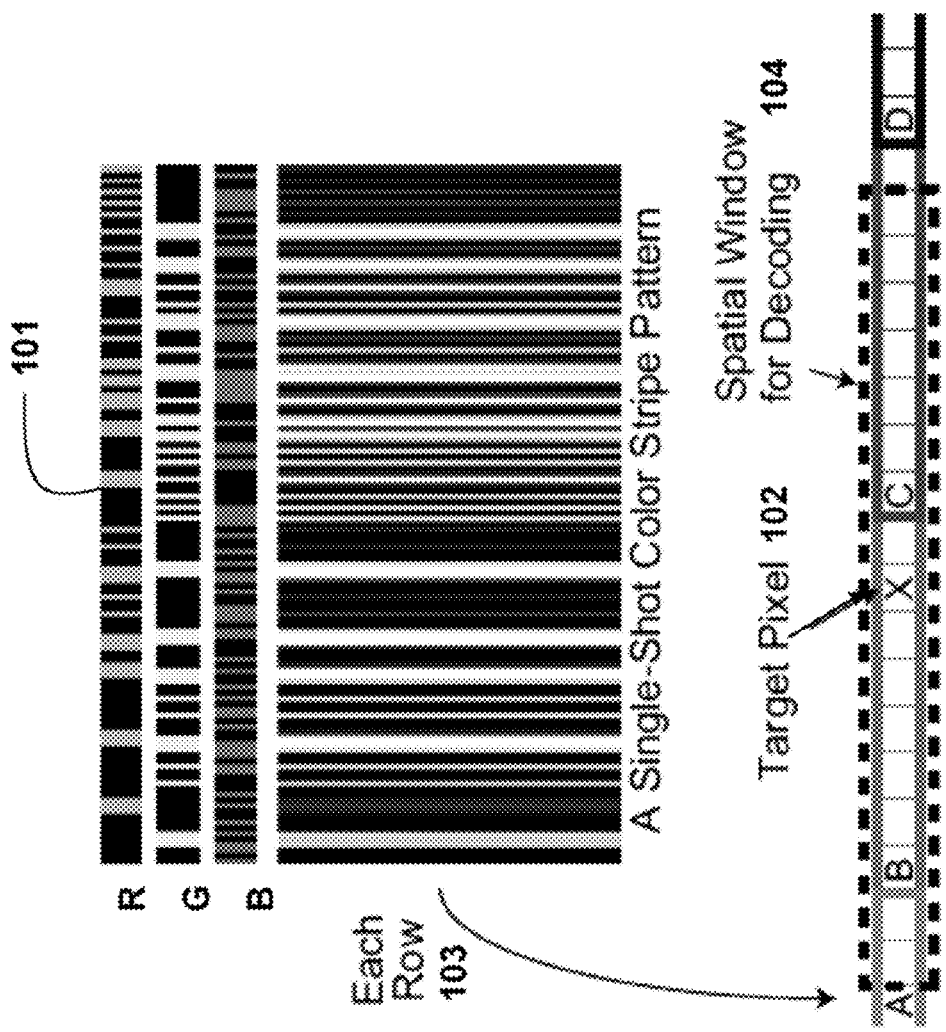

Table 1

| Current Pattern | $P_1$ | $P_2$ | $P_3$ | $P_4$ | $P_5$ | $P_6$ | $P_7$ | $P_8$ |
|---|---|---|---|---|---|---|---|---|
| 1-Frame Decoding | 17 | 17 | 17 | 17 | 17 | 17 | 17 | 17 |
| 2-Frame Decoding | 11 | 5 | 7 | 5 | 7 | 5 | 7 | 5 |
| 4-Frame Decoding | 5 | 3 | 5 | 3 | 5 | 3 | 5 | 3 |
| 8-Frame Decoding | 1 | 1 | 1 | 1 | 1 | 1 | 1 | 1 |

*Fig. 1C*

METHOD AND SYSTEM FOR GENERATING STRUCTURED LIGHT WITH SPATIO-TEMPORAL PATTERNS FOR 3D SCENE RECONSTRUCTION

BACKGROUND OF THE INVENTION

Projecting structured light (SL) onto scenes is one of the most reliable techniques for shape measurement and 3D scene reconstruction in computer vision and robotics applications. The correspondence problem present in stereo vision is simplified by projecting known patterns from a projector onto a scene, which is then imaged with a camera. For each pixel in the acquired image, the corresponding projector row or column is obtained by decoding the acquired patterns, followed by a ray-plane intersection to determine a 3D point.

Coded patterns, including Gray codes, are widely used to provide high quality reconstructions for static scenes. SL methods, using an N-bit binary Gray code pattern, project N binary images onto a scene to uniquely encode $2^N$ projector columns or rows. Using N acquired images, each pixel is decoded by identifying the corresponding projector column or row.

Single-shot SL methods project a single pattern that allows per-image reconstruction, and thus can be used for dynamic scenes and deforming objects. However, such methods decrease the spatial resolution and perform poorly near depth discontinuities, e.g., thin structures and edges, because a contiguous spatial neighborhood of pixels is required to perform the decoding for each pixel.

More importantly, prior art single-shot methods project the same pattern repeatedly for each time instant. Even if the scene is static, or if parts of the scene are slowly moving, prior art methods still decrease the spatial resolution as if the entire scene is dynamic. Thus, conventional single-shot methods are not motion-sensitive.

Furthermore, conventional single-shot methods typically reconstruct depths at sparse feature points such as edges, intensity peaks of color stripes, and 2D grid points, by using complex mechanisms and heuristics for decoding.

Single-Shot Structured Light

Single-shot structured light with spatial multiplexing can use 1D and 2D patterns to decode an image. A 1D De Bruijn sequence, having a window uniqueness property, is projected onto a scene to be decoded or reconstructed. The De Bruijn sequence enables unique decoding if a small spatial window of symbols is detected near a pixel. Color stripe patterns can be used to generate De Bruijn sequences when more than two symbols are required. Examples of 2D patterns include grid patterns and M-arrays, and perfect sub-maps using various geometric shapes and colors.

One technique uses a low cost 3D sensor for computer vision and human-computer interaction applications. That technique projects an infrared random dot 2D pattern as the single-shot pattern, which is acquired using an infrared camera. The matching is done per image, and depth maps for a dynamic scene can be obtained in real time. However, the depth maps are noisy especially near depth discontinuities.

All of the above methods project the same pattern for every image, process each image independently, and are not motion-sensitive.

Another method registers the above depth maps and then reconstructs a static 3D scene with a higher quality compared to raw depth maps.

Spatio-Temporal Decoding

Structured light patterns that are spatio-temporally decodable are known. However, conventional methods require disconnected windows of pixels for decoding, and thus do not reduce the effective size of spatial neighborhood required for decoding using all patterns.

The spatial resolution can also be improved by shifting a single-shot color stripe pattern one pixel at a time and analyzing the temporal profile for each pixel using all of the shifted patterns. However, that method is not hierarchical. That method requires the entire scene to be static during the projection of all shifted patterns to reduce the spatial neighborhood to a single pixel.

Flexible voxels enable a spatio-temporal resolution trade-off for reconstructing a video depending on the motion of each pixel.

Adaptive Window Matching

Spatio-temporal windows have been used for stereo processing to improve the matching quality. However, for stereo processing, the size of the window is typically fixed for every pixel, or regular box shaped windows are used.

SUMMARY OF THE INVENTION

Single-shot structured light (SL) methods enable 3D shape determination and reconstruction of dynamic scenes. However, conventional methods decrease the spatial resolution and perform poorly near depth discontinuities, such as edges.

Conventional single-shot methods project the same pattern repeatedly, which reduces the spatial resolution even if the scene is static or has slow moving parts.

The embodiments of the invention provide a method and system for reconstructing a 3D shape of a scene using a structured light system that projects a set of sequentially shifted striped patterns that is decodable spatially and temporally.

The method enables single-shot 3D reconstruction with any of the projected patterns by using spatial windows. Moreover, the sequence of patterns progressively improves the reconstruction quality near depth discontinuities by also using temporal windows. In other words, the more patterns that are used, the more accurate the reconstructions.

The method enables motion-sensitive reconstruction for each pixel. An optimal spatio-temporal window is automatically selected depending on the scene structure, motion, and the number of available images. This significantly reduces the number of pixels near discontinuities where depth cannot be obtained with conventional single-shot methods.

The decoding uses an adaptive window matching that includes 1D spatial windows, and temporal windows. The adaptation is according to spatial and temporal characteristics of a scene onto which the patterns are projected.

The invention has a number of advantages for a variety of scenarios, including thin structures, dynamic scenes, and scenes containing both static and dynamic regions.

BRIEF DESCRIPTION OF THE DRAWINGS

FIG. 1A is a schematic of a prior art striped structured light pattern;

FIG. 1C is a table of spatial window size s required at each image for decoding using different numbers of images (frames) and patterns;

DETAILED DESCRIPTION OF THE PREFERRED EMBODIMENTS

The embodiments of our invention provide a method and system for reconstructing a scene using structured light using a set of spatio-temporal decodable patterns.

Figure 4A:
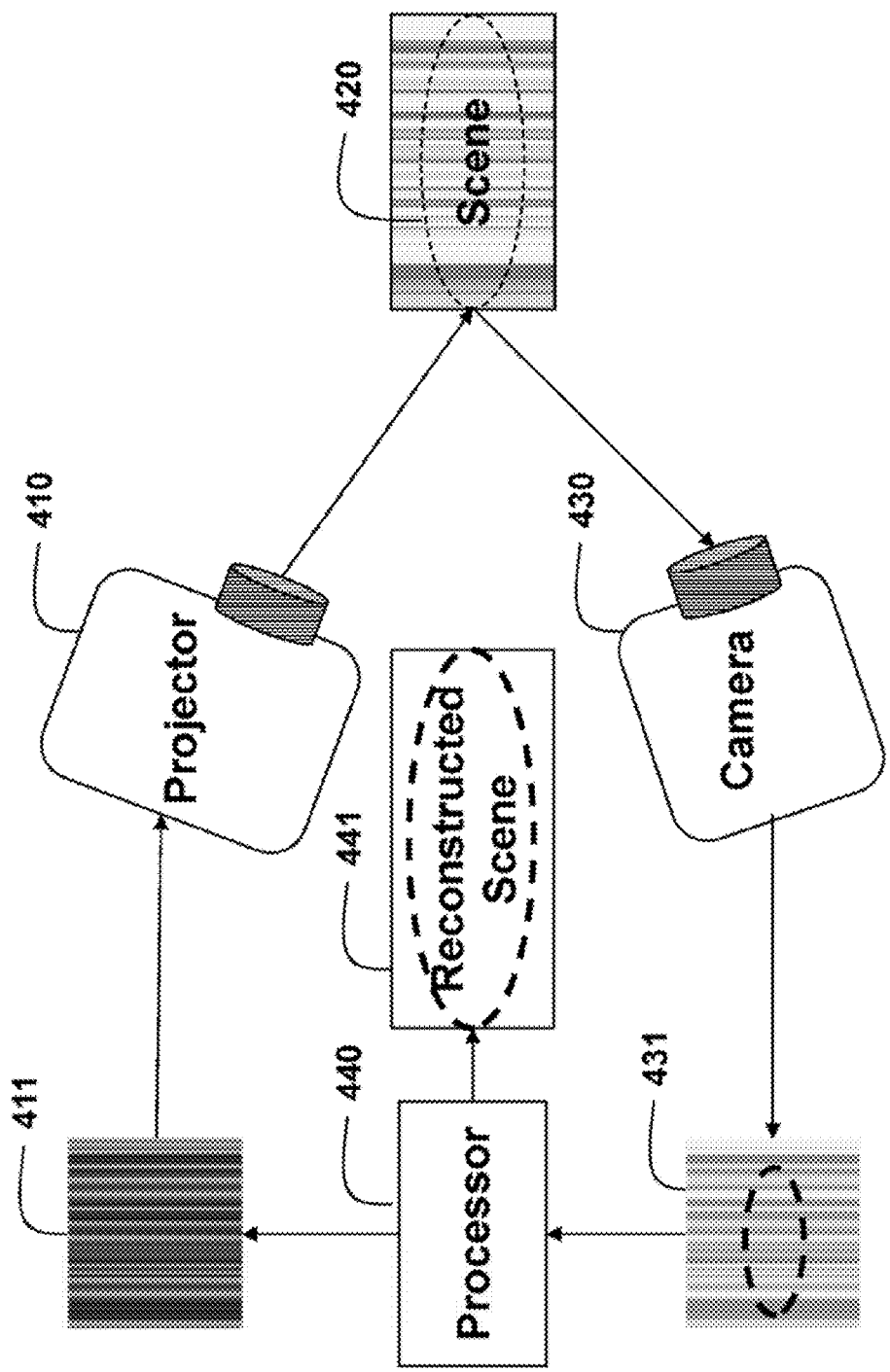
FIGS. 4A-4B are block and 3D diagrams of a method and system for reconstructing a scene using structured light with spatio-temporal decodable patterns according to embodiments of the invention.
Figure 4B:
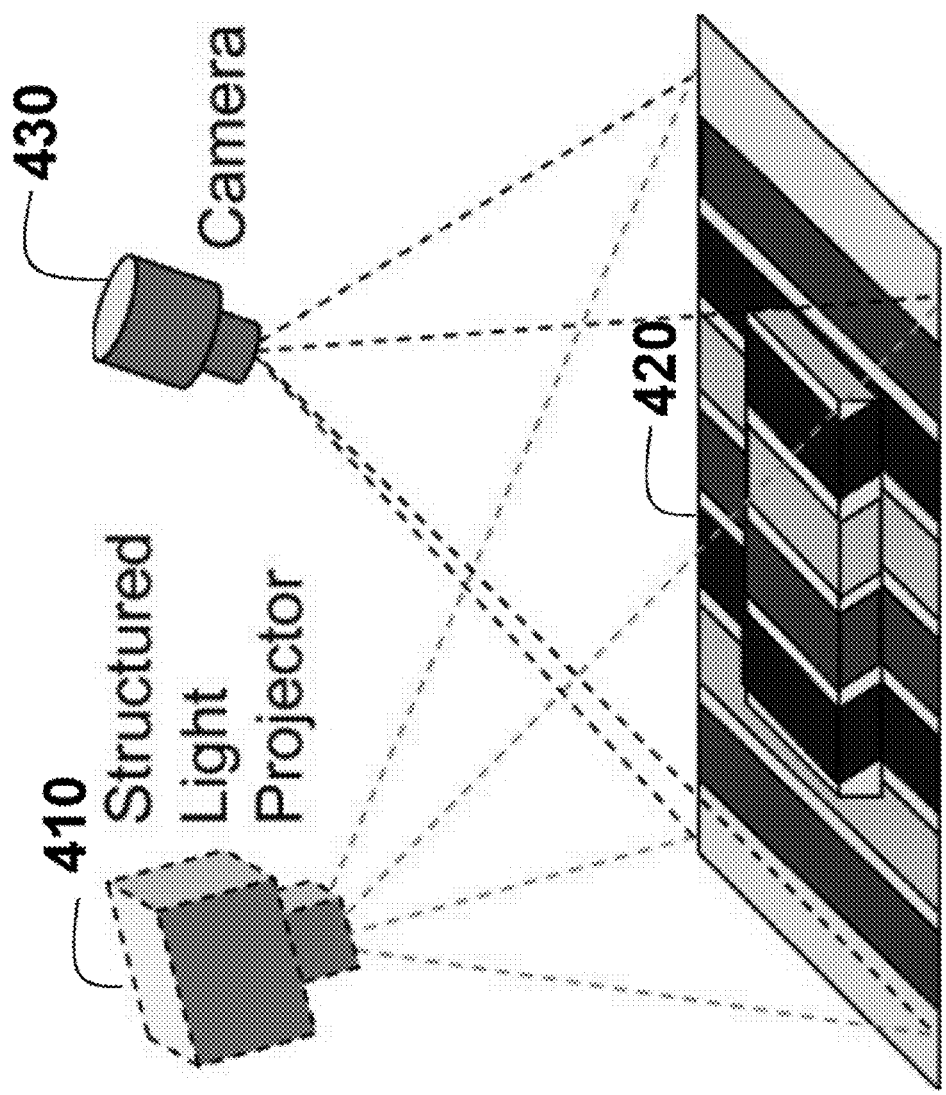

FIGS. 4A and 4B show a basic setup of the system schematically and in 3D, respectively. A projector 410 projects a set of patterns 411 onto a scene 420. A camera 430 acquires a set of images 431 of the scene with the projected patterns. A processor 440 generates the set of pattern, and decodes the patterns to generate a reconstructed scene 441. The processor includes memory and input/output interfaces as known in the art. The processor can be connected to the projector and camera for synchronized operation.

Spatio-Temporal Decodable Patterns

We first describe the generation of our set of spatio-temporal decodable patterns for SL systems. The patterns can be used for a number of other computer vision applications, such as 3D surface scanning, dynamic scene illumination, distortion correction, and advanced human machine interfaces. Then, we describe a reconstruction method to select the optimal spatio-temporal neighborhood for decoding each pixel in the set of images 431.

Single-Shot Decoding

Similar to conventional single-shot methods, we use color stripes as our base pattern. De Bruijn sequences are typically used for designing a sequence of symbols (color of each stripe) to ensure the uniqueness of local spatial neighborhood windows. A De Bruijn sequence is a cyclic sequence for which every possible subsequence of a specified window length k is unique and appears exactly once in the pattern. Other patterns and sequences that have similar uniqueness characteristics can also be used.

To uniquely determine the position in a De Bruijn sequence having the window length of k, we need to observe at least k consecutive symbols, encoded as colors in the pattern 411. Each stripe (symbol) is projected using a stripe width of l projector pixels to avoid color bleeding in projected images, and to accurately detect the colors and edges of the stripes.

For example, one embodiment uses a De Bruijn sequence with the window property k=3, and the stripe width l=8 in terms of the projected pixels. Using four different colors and two different intensity levels, a De Bruijn sequence of length 128 can be obtained, which can be projected using 128×l projector columns, which is sufficient to cover the entire columns of conventional projectors.

FIG. 1A shows a conventional 1D color stripe pattern 101 generated using the above De Bruijn sequence with window property k=3 and stripe width l=8. In the sequence, the triplets of consecutive symbols (A, B, C) and (B, C, D) are unique. For any target pixel 102 in each row 103, three unique symbols can be observed within l=8 pixel left and right neighborhoods; i.e., to uniquely determine the position of the target pixel for the decoding, a minimal spatial window 104 of (2×8)+1=17 pixels in the projected pattern 411 is required.

In general, for a window of length k and the stripe width l, a minimal spatial window of $2 \times \times \lfloor k/2 \rfloor + 1$ pixels is required to ensure unique decoding at each pixel. If the sequence is damaged due to depth discontinuities in this spatial window, then the decoding cannot be performed. Thus, the reconstruction using a single color stripe pattern performs poorly at depth discontinuities, and loses spatial resolution.

Our goal is to design the sequence of patterns in the set such that the pixels from temporal neighborhood can be used for decoding to reduce a size of the spatial neighborhood required for the decoding.

Design of Pattern for Sequence

One idea behind our invention is to arrange the transitions of symbols hierarchically in time by shifting the base pattern. In general, the number of patterns in the sequence required to enable pixel-wise decoding is equal to maximum (k, l).

Figure 1B:
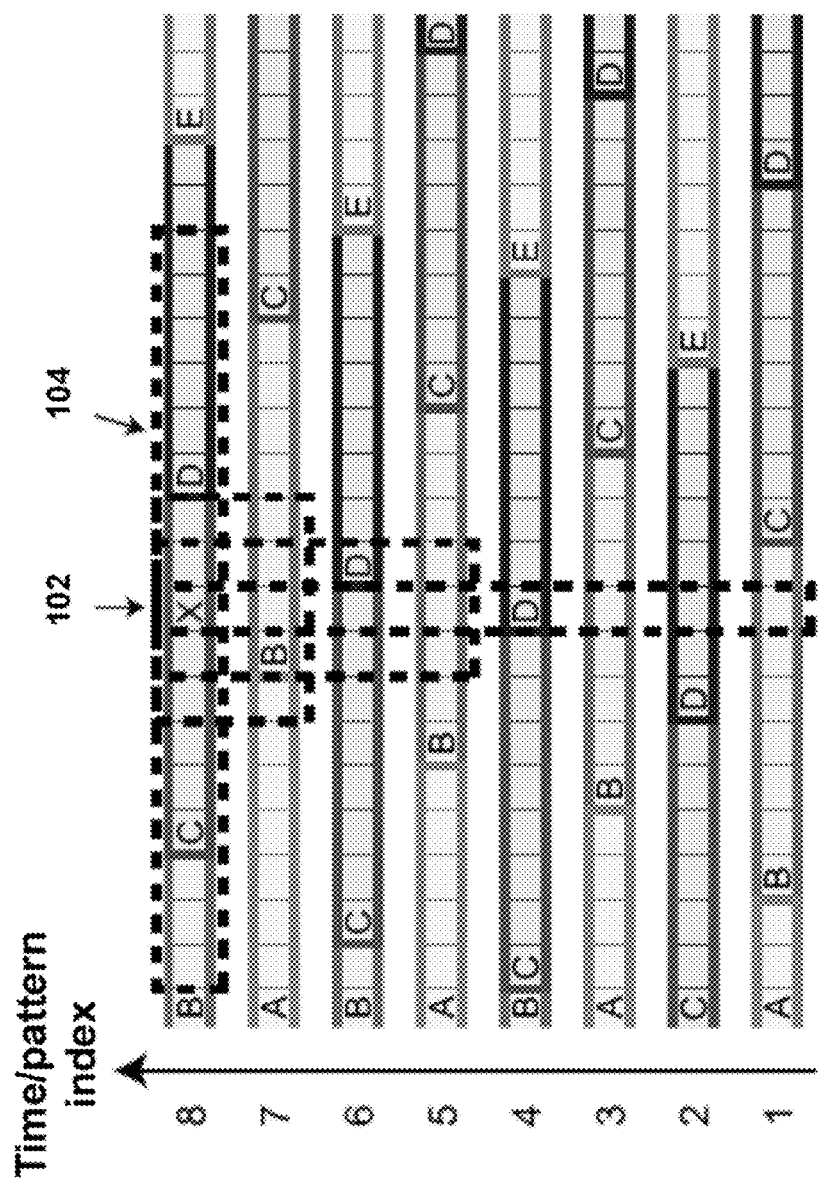
FIG. 1B is a schematic of a set of sequentially shifted, striped structured light patterns using a De Bruijn sequence with spatial and temporal variations according to embodiments of the invention.

FIG. 1B shows our set of spatio-temporally decodable patterns for k=3, and l=8. The eight patterns $P_i$ (i=1, ..., 8), as a function of the time/pattern index 1-8, are generated by circularly shifting the base pattern $p_1$ with different shifts, see FIG. 5. A size of the spatial window is hierarchically reduced as we use larger temporal neighborhoods. Each spatio-temporal window 104 includes a unique set of symbols, ensuring unique decoding.

A size of the spatial window required for decoding using t images (frames) is s. We refer to decoding using t-images as t-image decoding.

Figure 5:
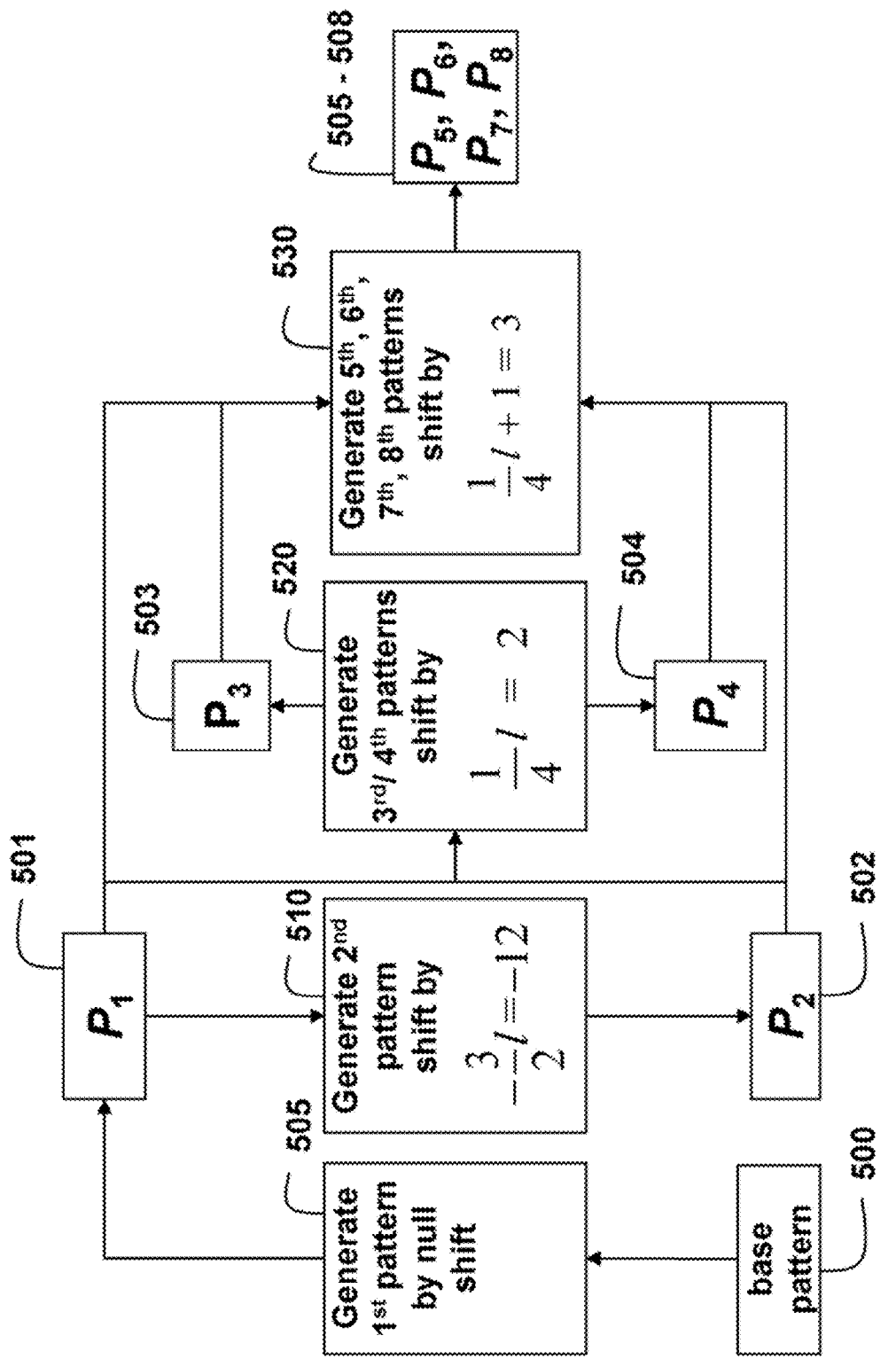
FIG. 5 is a block diagram of a method for generating the pattern of FIG. 1B according to embodiments of the invention.

The method for generating our pattern is shown in FIG. 5. Each step doubles the number of patterns. The steps can be performed in the processor 140.

We start with an initialized base pattern 500, and generate 505 a first pattern $P_1$ 501 by a null shift (no operation). We generate 510 a second pattern $P_2$ 502 by shifting $P_1$ by $$-\frac{3}{2}l = -12$$

pixels. We generate 520 third and fourth patterns $P_3$ 503 and $P_4$ 504 by shifting $P_1$ and $P_2$ by $$\frac{1}{4}l = 2$$

pixels, respectively. Then, we generate fifth, sixth, seventh, and eighth patterns $P_5$, $P_6$, $P_7$, $P_8$ 505-508 by shifting $P_1$, $P_2$, $P_3$, $P_4$ by $$\frac{1}{4}l + 1 = 3$$

pixels, respectively. The stripe width is l.

The sequence of patterns $P_1$-$P_8$ in the set can be periodically projected. To decode an image with the projected pattern $P_i$, we use previous images with projected patterns $P_{i-1}$, $P_{i-2}$, ... for spatio-temporal decoding.

FIG. 1C shows Table 1 where the spatial window size s required at each image for decoding using different numbers of previous images (frames). The spatial window size s is determined so that one can observe unique triplets of symbols (because k=3) at any target pixel at different time instances using t images. Note that [†] in the Table can be 7 if we continuously shift the pattern, instead of using the eight patterns periodically.

The size of the spatial neighborhood decreases as more temporal patterns are used. Note, the spatio-temporal windows are not disjoint. In addition, decoding can be done for any pixel in all projected patterns. If all eight patterns are used, then the spatial window size is only one pixel, allowing per-pixel reconstruction similar to temporally coded SL.

Motion-Sensitive Decoding

Figure 2:
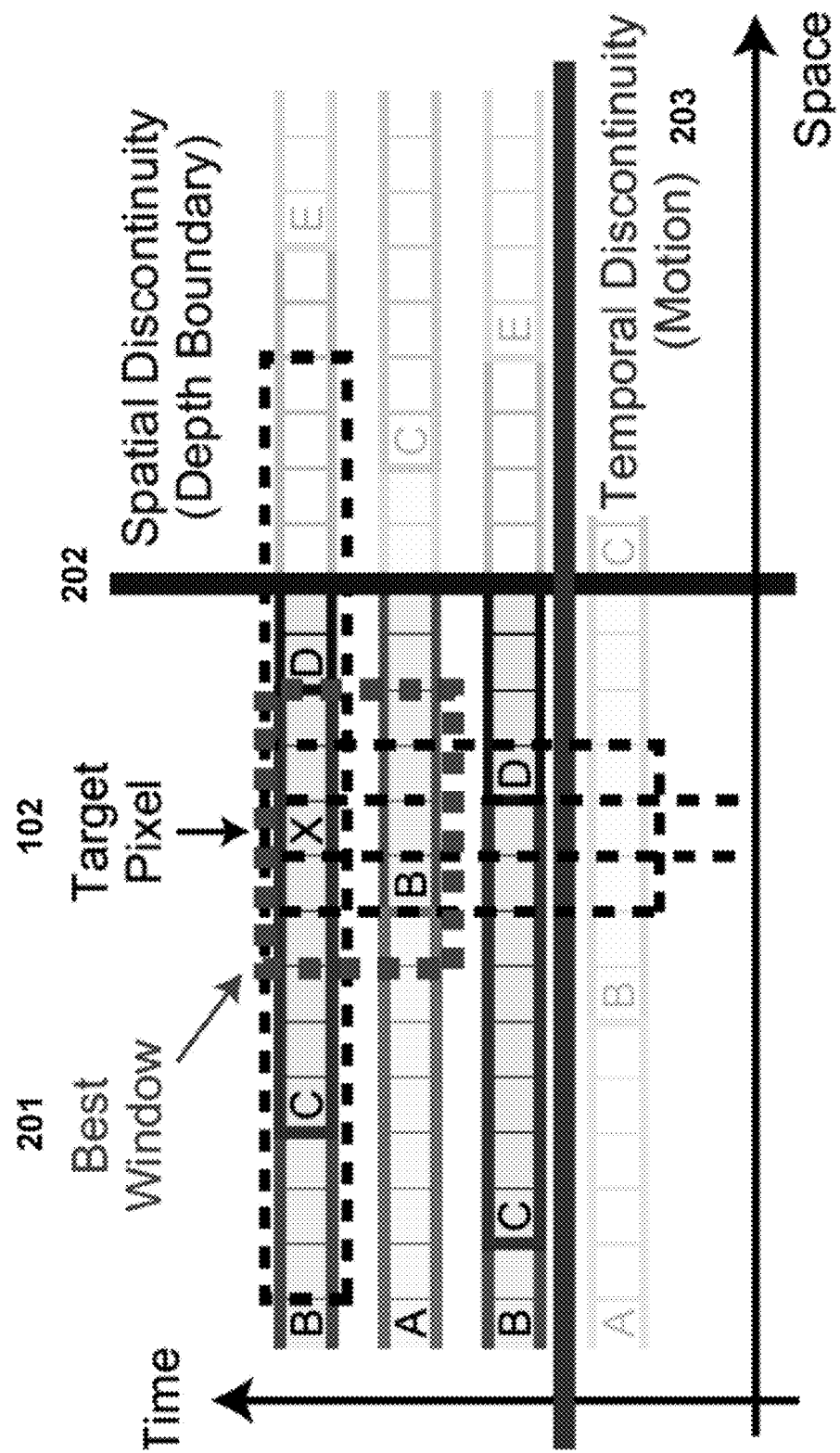
FIG. 2 is a schematic of motion-sensitive spatio-temporal window selection as a function of time and space according to embodiments of the invention.

FIG. 2 shows the principle of our motion-sensitive spatio-temporal window selection, as a function of time and space. Above, we described how different spatio-temporal windows can be used for decoding any target pixel (x). We determine the optimal spatio-temporal window 201 to use for a given target pixel 102.

A spatially large window causes decoding error if the target pixel is located near a depth discontinuity 202, while a temporally large window causes error if the target pixel is not static, i.e., the pixel is in motion and there is a temporal discontinuity 203.

The optimal window has a small spatial support for enabling decoding near depth discontinuities, while aggregating temporal information if multiple images are available and the target pixel is static or slowly moving.

Shiftable and Adaptive Windows

Our patterns and windows are adaptive to spatial and temporal characteristics of the scene. For example, a target pixel is located on a planar region, but near a depth discontinuity. A spatial window centered at the target pixel produces a decoding error, while the spatial windows shifted left and right within ±s pixels can avoid the discontinuity, and can provide the correct disparity value for stereo matching.

Figure 3:
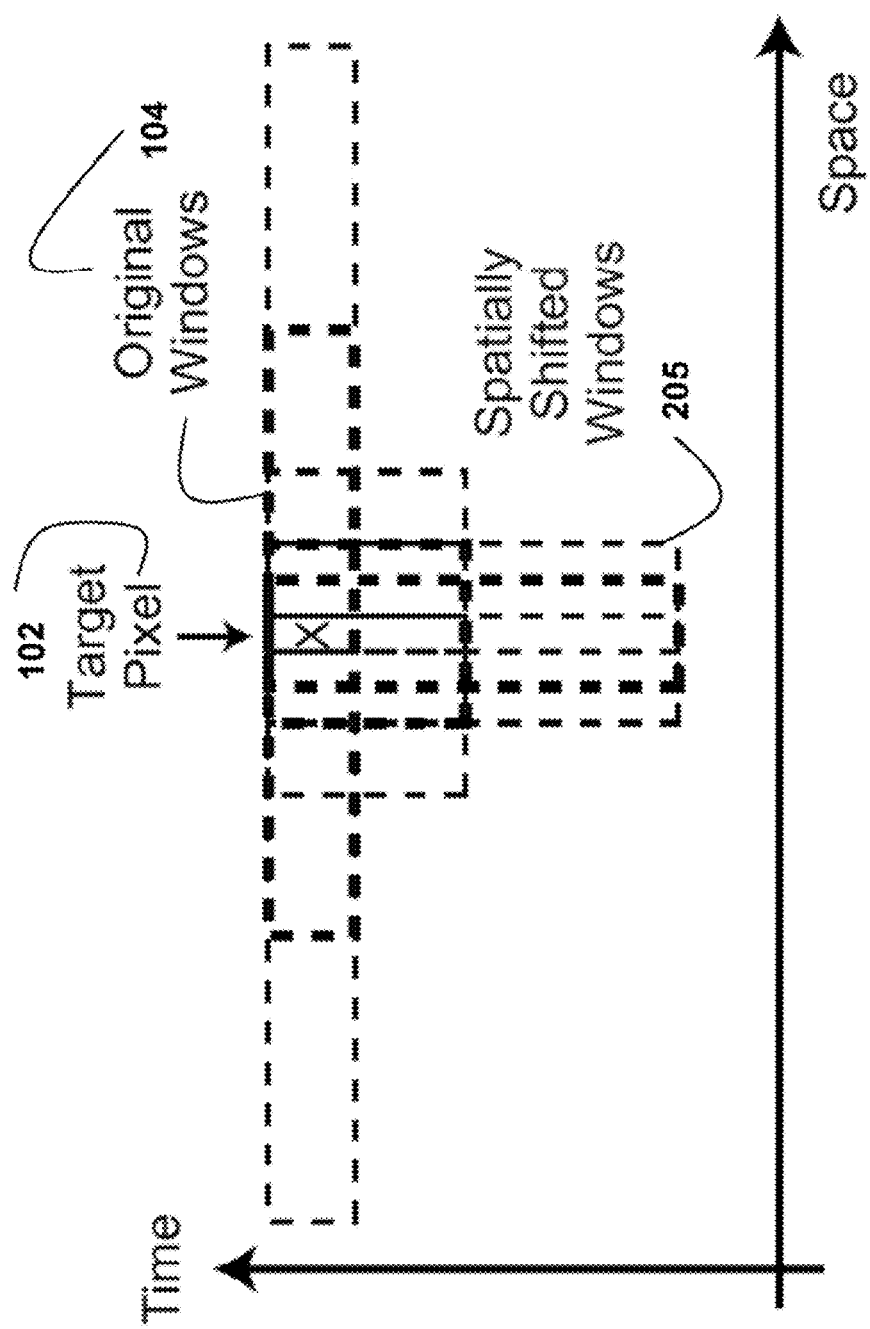
FIG. 3 is a schematic of 1D shifted windows according to embodiments of the invention.

We only need to use 1D spatial shifts, as shown in FIG. 3, instead of 2D shifts typical in stereo matching. FIG. 3 shows original spatio-temporal windows 104 along with their spatially shifted versions 205. Spatially shifted adaptive windows can be used to recover depth near depth discontinuities, if one of the shifted windows is placed on a planar region. For simplicity, the figure shows spatially shifted windows 205 shifted with $\pm\lfloor s/2 \rfloor$ pixels from the original windows 104. In practice, we use a total of $2\lfloor s/2 \rfloor+1$ windows shifted pixel-by-pixel within $\pm\lfloor s/2 \rfloor$ pixels.

Reconstruction Method

We describe our method that automatically selects the optimal window from the set of spatio-temporal windows depending on the context.

Single-shot SL systems using color stripes and 2D patterns typically reconstruct depths at sparse points, such as edges between strips, intensity peaks, or grid points.

In contrast, we provide a reconstruction method that enables pixel-wise dense depth recovery using plane sweeping. In plane seeping, an imaginary plane is swept or moved over the 3D volume, stopping at some points. For each pixel in the camera image, a matching score is determined on the sweep plane whenever the plane stops, and an optimal depth value is determined as the position of the plane that produces the highest matching score.

We define a set of D depth layers with depth values $[d_i]_{i=1}^{D}$ in a camera coordinate system. Our goal is to determine the optimal depth value for each pixel as observed in the camera image. For each depth layer, we determine a matching score between the acquired images, and the patterns projected onto the depth layer using several spatio-temporal windows.

The set of all spatio-temporal windows used for matching is Q, which depends on the number of available images. The maximal temporal window size among all windows in Q is $t_{max}$. We refer to such decoding as $t_{max}$-image decoding.

The matching score for a pixel x in the camera at depth $d_i$ is defined as $$S(x, d_i) = \max_{q \in Q} w(q) S(q, x, d_i),$$

where $S(q,x,d_i)$ is the matching score using the spatio-temporal window q at the pixel x and the depth $d_i$, and w(q) is a weight for the window.

For scenes with fast motion, we decrease the weight w(q) according to the size of the temporal window t. To use our shiftable windows, we augment Q by adding shifted versions of the spatio-temporal windows. We set the weight w(q) for the shiftable window such that it decays linearly with the amount of the spatial shift to avoid stair-like artifacts for slanted planes. We determine the size of the spatial window depending on the size of the stripes in the acquired images. We assume that the size of the stripes does not change considerably over the image.

Matching Score

We use a normalized cross correlation (NCC) as the matching score. To determine the NCC score for several spatio-temporal windows with different sizes, we use a 2D integral image representation. After smoothing the scores with a small local window (3×3), we reconstruct the depth value for each pixel x by determining the maximal score, $S_{max}=\max_i \bar{S}(x,d_i)$. If the maximal score $S_{max}$ is smaller than a threshold, e.g., 0.8, then we mark the pixel as unknown.

Unknown pixels are caused by decoding errors and also include pixels in occluded (shadow) regions. We can also use global optimization techniques such as graph cuts or belief propagation by using the scores $S(x,d_i)$ as a data term.

Calibration

We perform geometric calibration between the camera and the projector using checkerboards and performed color calibration by determining the projector-camera coupling matrix and an RGB offset due to ambient light.

As our base pattern, we used a De Bruijn sequence with color stripes. We alternate the intensities of neighboring stripes with high (1) and low (0.5) values, while using 4 hues, e.g., at angles 45°, 135°, 225°, 315° on the hue circle, to encode eight symbols with the window property of three.

Static Scene

Our sequence of patterns enables single-shot decoding at any frame using spatial windows, as well as decoding using multiple frames to improve the accuracy near depth discontinuities on static scenes. Our reconstruction accuracy improves near depth discontinuities with the number of images used for decoding. Our 8-shot decoding provides accurate results similar to using temporally coded SL using Gray codes.

Scenes with Thin Structures

As described above, thin structures, as well as depth discontinuities, cannot be recovered using conventional single-shot decoding due to the large size of spatial neighborhood required for decoding and depth discontinuities that are not well-separated. In contrast, our sequence of patterns improves the reconstruction accuracy as more images become available using spatially small and temporally large windows.

Scenes Including Both Static and Dynamic Parts

For motion-sensitive reconstruction of scenes with static and moving parts, we acquire a single image with the projected pattern at each time instant, and then remove a single object from the scene. Thus, some parts of the scene remain static while others change dynamically. At each time instant, the depth map is reconstructed using the current and previous images, up to eight images.

In static regions of the scene, the reconstruction accuracy improves as more images become available. In contrast, for parts of the scene that changed by the removal, our method automatically selects a larger spatial window for decoding, recovering depth at a coarser resolution. Thus, motion-sensitive depth reconstruction is useful in applications such as robotic bin picking, where a system detects and estimates poses of objects in a bin using 3D data obtained with structured light, and grasps one object at a time.

For single-shot decoding, shiftable windows improve reconstruction accuracy near depth discontinuities. Our motion-sensitive reconstruction method using 8-shot decoding produces even better results by fusing temporal information for pixels that are static or slowly moving for several consecutive images.

Dynamic and Deforming Objects

Even for dynamic scenes, if a region remains static or is slowly moving for several consecutive images, our method can improve the reconstruction accuracy. By using single-shot decoding, our reconstruction method using shiftable windows produces better results than that without using shiftable windows. Using multiple images, our method further improves the accuracy by using temporal information for regions that remain static, or were slowing moving in previous images. The number of unknown pixels near depth discontinuities that cannot be decoded is reduced as more images are utilized.

Because color boundaries act as spatial discontinuities, decoding using a large spatial window fails to reconstruct depth near color boundaries. By using a smaller spatial window with multiple images, the reconstruction can be improved.

The accuracy of our reconstruction depends on the number of depth layers D, which causes the tradeoff between the accuracy and processing time. If the depth variation of the scene is large, then more depth layers are required to achieve similar depth resolution, increasing the processing time. Typical single-shot reconstruction methods using color stripes do not have this tradeoff, because those methods locate symbols at feature points (edges or intensity peaks) in each row of an image and use those symbols for triangulation. Such methods determine depth values only for the detected sparse feature points, while our method determines pixel-wise dense depth maps.

EFFECT OF THE INVENTION

The embodiments of the invention provide a motion-sensitive structured light system that can handle dynamic scenes with different motions in different parts of the scene.

Compared to conventional structured light systems, our method improves depth reconstruction for static and slow moving parts of the scene and results in better estimation of depth discontinuities.

We use structured light patterns that are decodable both spatially and temporally, for motion-sensitive reconstruction. Our reconstruction method extends stereo matching techniques using adaptive windows and can be implemented on graphics processing units (CPUs).

We describe how to design structured light patterns that are decodable both spatially and temporally. Our patterns allow motion-sensitive 3D reconstruction in an automatic way, without any user interaction.

For example, if the scene includes both dynamic and static or slow moving objects, our design automatically obtains better depth reconstruction on the objects by using temporal neighborhood information.

Conventional single-shot methods that use a 1D stripe pattern can be augmented to become motion-sensitive using our technique.

In particular, we use a 1D color De Bruijn stripe pattern ($P_1$) for single-shot reconstruction. We design a sequence of N patterns, $P_1, \ldots, P_N$, by appropriately shifting the symbols of $P_1$.

The sequence of patterns is projected repeatedly on the scene as $P_1, \ldots, P_N, P_1, \ldots, P_N, \ldots$. By default, each projected pattern $P_i$ enables single-shot reconstruction using spatial neighborhoods because it is a shifted version of $P_1$.

In addition, the patterns are designed such that the size of spatial neighborhood decreases as the number of patterns increases, leading to per-pixel reconstruction using all N patterns. Because the spatio-temporal neighborhood is selected automatically, smaller spatial windows are used for slowly moving objects (1 pixel spatial neighborhood for static scenes), leading to motion-sensitive reconstruction.

We apply a plane sweep method for structured light decoding and to determine dense depth maps. Our reconstruction scheme generates multiple layered images by projecting each pattern at several depth layers, determines matching scores with the acquired images for several spatio-temporal neighborhoods at each layer, and selects the optimal depth layer that has the maximal score.

A main contribution to the art includes motion-sensitive structured light decoding using spatio-temporal decodable patterns.

We provide a method for motion-sensitive structured light reconstruction, which enables tradeoff between the amount of motion and reconstruction quality for dynamic scenes.

We provide a method for generating a sequence of stripe structured light patterns that is decodable both spatially and temporally.

We extend a plane sweep based method for structured light decoding using adaptive spatio-temporal windows.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for generating a structured light pattern, wherein the structured light pattern includes a set of patterns in a sequence, comprising the steps of:

initializing a base pattern, wherein the base pattern includes a sequence of colored stripes such that each subsequence of the colored stripes is unique for a particular size of the subsequence;

shifting hierarchically, spatially and temporally the base pattern a predetermined number of times to generate the set of patterns, wherein each pattern is different spatially and temporally, wherein the shifting further comprises:

initializing a first pattern to the base pattern, wherein the colored stripes in the base pattern have a stripe width of l=8 in terms of pixels in the pattern as projected, and each consecutive 3 stripes is unique;

shifting the first pattern by $$-\frac{3}{2}l = -12$$

to obtain a second pattern;
shifting the first and second patterns by $$\frac{1}{4}l = 2$$

to obtain third and fourth patterns, respectively; and
shifting the first, second, third, and fourth patterns by $$\frac{1}{4}l + 1 = 3$$

to obtain fifth, sixth, seventh and eighth patterns, respectively; and
determining, while projecting the set of patterns onto the scene, a unique location of each pixel in a set of images acquired of a scene with respect to the set of patterns, wherein there is one image for each pattern, and wherein the initializing, shifting and determining steps are performed in a processor.

2. The method of claim 1, wherein the unique location of each pixel is used to determine a three-dimensional location corresponding to the pixel.

3. The method of claim 1, wherein the base pattern is a De Bruijn sequence of colored stripes.

4. The method of claim 1, wherein the unique location of each pixel is determined using a set of spatio-temporal windows, each of which includes a unique set of symbols to ensure unique decoding.

5. The method of claim 4, wherein an optimal spatio-temporal window is selected from the set of spatio temporal windows adaptively based on spatial and temporal characteristics of the scene.

6. The method of claim 5, wherein the optimal spatio-temporal window is selected based on a matching score determined using plane sweeping.

7. The method of claim 1, wherein the structured light pattern is used for industrial robotic applications.

8. The method of claim 7, wherein the industrial application is bin picking.

9. The method of claim 1, wherein the scene includes static or dynamic parts, or both.

10. The method of claim 2, further comprising:
reconstructing the scene using the three-dimension locations.

11. The method of claim 1, wherein the determining is motion sensitive.

12. The method of claim 6, wherein the plane sweeping further comprises:
defining a set of depth layers in a camera coordinate system;
determining, for each pixel in the set of images, matching scores between the spatio-temporal windows in the set of images and the spatio-temporal windows in the patterns projected onto the set of depth layers; and
determining a depth value of the pixel as a position of the depth layer that produces a highest matching score.

13. The method of claim 12, wherein the matching score is a normalized cross correlation.

14. The method of claim 12, further comprises:
determining the depth value of the pixel as unknown if the highest matching score is smaller than a threshold.

* * * * *